US011759907B2

(12) United States Patent
Lint et al.

(10) Patent No.: US 11,759,907 B2
(45) Date of Patent: Sep. 19, 2023

(54) COUNTERBALANCED TIRE PROFILE GENERATING MACHINE (71) Applicant: AKRON SPECIAL MACHINERY, INC., Akron, OH (US)

(72) Inventors: Charles A. Lint, Massillon, OH (US); Brian D. Mitchell, Akron, OH (US); William P. Laughlin, Bath, OH (US)

(73) Assignee: AKRON SPECIAL MACHINERY, INC., Akron, OH (US)

( * ) Notice: Subject to any disclaimer, the term of this patent is extended or adjusted under 35 U.S.C. 154(b) by 1044 days.

(21) Appl. No.: 16/565,650

(22) Filed: Sep. 10, 2019

(65) Prior Publication Data
US 2020/0086448 A1 Mar. 19, 2020

Related U.S. Application Data

(60) Provisional application No. 62/731,224, filed on Sep. 14, 2018.

(51) Int. Cl.
*B24B 5/04* (2006.01)
*B24B 41/02* (2006.01)
(Continued)

(52) U.S. Cl.
CPC .............. *B24B 5/366* (2013.01); *B24B 5/363* (2013.01); *B24B 27/0046* (2013.01);
(Continued)

(58) Field of Classification Search
CPC .. B24B 5/02; B24B 5/04; B24B 5/363; B24B 5/366; B24B 27/0046; B24B 27/0084;
(Continued)

(56) References Cited

U.S. PATENT DOCUMENTS 2,294,047 A * 8/1942 Pollock ............... B29B 17/0206
409/218
3,137,976 A * 6/1964 Cooper .............. B29D 30/0633
451/254
(Continued)

FOREIGN PATENT DOCUMENTS

CN 106985038 A 7/2017
CN 107052944 A 8/2017
(Continued)

OTHER PUBLICATIONS

First Office Action in China Application No. 201910870517.9 dated Mar. 17, 2022, with a summary partial translation thereof.
(Continued)

*Primary Examiner* — Eileen P Morgan
(74) *Attorney, Agent, or Firm* — Renner, Kenner, Greive, Bobak Taylor & Weber (57) ABSTRACT

A tire grinding machine includes a frame having a plurality of vertically extending posts. A chuck assembly is associated with the frame and adapted to receive and rotate a tire. A grinding assembly is associated with the frame and is movable with respect to the frame. The grinding assembly has at least one grinding element adapted to contact and remove material from the tire when rotated by the chuck assembly. A counterbalance assembly which has a cable with one end connected to a counterbalance weight and an opposite end connected to the grinding assembly is included. A block assembly may be coupled to the grinding assembly to allow pivotable movement thereof. A calibration adapter may be used to ensure proper positioning of the grinding elements, wherein a level adjuster may be used for this purpose.

18 Claims, 10 Drawing Sheets

(51) Int. Cl.
  *B24B 49/12* (2006.01)
  *B24B 5/36* (2006.01)
  *B29D 30/06* (2006.01)
  *G01M 17/02* (2006.01)
  *B24B 27/00* (2006.01)

(52) U.S. Cl.
  CPC ...... *B24B 27/0084* (2013.01); *B29D 30/0633* (2013.01); *G01M 17/024* (2013.01); *B29D 2030/0638* (2013.01)

(58) Field of Classification Search
  CPC ..... B24B 41/02; B24B 49/12; B29D 30/0633; B29D 2030/0638; G01M 17/024
  USPC .. 451/5, 6, 51, 57, 189, 242, 244, 246, 254, 451/385, 398, 405, 920
  See application file for complete search history.

(56) References Cited

U.S. PATENT DOCUMENTS

| | | | | |
|---|---|---|---|---|
| 3,290,831 A * | 12/1966 | Laube | ............... | B29D 30/72 451/254 |
| 3,899,917 A * | 8/1975 | Kisbany | ............... | G01N 3/56 73/8 |
| 3,953,942 A | 5/1976 | Nisimura | ............... | 51/33 W |
| 4,736,546 A * | 4/1988 | Ugo | ............... | B24B 49/165 451/8 |
| 5,256,445 A * | 10/1993 | Nojiri | ............... | B05D 3/12 118/227 |
| 6,050,876 A * | 4/2000 | Ouyang | ............... | G01M 17/024 451/6 |
| 6,620,030 B1 * | 9/2003 | Delmoro | ............... | B24B 5/366 451/28 |
| 6,931,911 B1 * | 8/2005 | Delmoro | ............... | G01M 17/021 73/1.14 |
| 7,381,114 B2 * | 6/2008 | Poling, Sr. | ............... | B24B 41/002 451/920 |
| 9,833,931 B2 * | 12/2017 | Mitchell | ............... | B24B 5/366 |
| 10,302,532 B2 | 5/2019 | Anenson et al. | ... | G01M 17/027 |
| 2012/0079868 A1 | 4/2012 | Okada et al. | ............... | 73/1.15 |

FOREIGN PATENT DOCUMENTS

| | | | |
|---|---|---|---|
| GB | 843530 | 8/1960 | |
| JP | 2016135520 A | 7/2016 | ............... B24B 1/04 |

OTHER PUBLICATIONS

European Search Report dated Jul. 2, 2020 in related application No. 19197234.8.

* cited by examiner

COUNTERBALANCED TIRE PROFILE GENERATING MACHINE

CROSS-REFERENCE TO RELATED APPLICATIONS

This application claims priority of U.S. Provisional Application Ser. No. 62/731,224 filed Sep. 14, 2018, which is incorporated herein by reference.

TECHNICAL FIELD

In general, the present invention relates to a tire profile generating machine. More particularly, the present invention relates to a machine employing a grinding assembly, which is supported by a counterbalance assembly. Most particularly, the present invention relates to a grinding assembly with precise positioning capabilities supported by a concealed counterbalance assembly.

BACKGROUND OF THE INVENTION

In tire uniformity machines, a tire is tested by rotating it at various speeds to ensure that the tire has been constructed to perform within quality control standards. During this testing process, the tire is rotated, and the tire uniformity machine examines the tire's integrity, shape, and surface qualities to a high degree of accuracy with a measuring laser. At times, during examination, the tire uniformity machine detects irregularities in the tire. Any irregularity in the integrity, surface, and shape of the tire may be corrected by removing material from appropriate portions of the tire.

To remove material from a tire, known tire uniformity machines typically employ a grinding assembly having multiple grindstones rotating in relation to the rotation of the tire. Indeed, it has been found that two counter-rotating grindstones provide a smoother surface for the tire. Often a motor and gear box arrangement is used to control the speed and direction of rotation of each grindstone. As such, the motor is connected to the gear box arrangement by belts or chains and a series of pulleys or sprockets. Because the motor needed to drive the belts or chains, and the gear box arrangement is bulky, the housing of the motor projects to such an extent it can be difficult to precisely place the grindstones in a desired position with respect to the tire. One way to accommodate the limited area for positioning the grinder is to attach the motor distally from the grinder on a limited-range pivoting arm, away from the confines of the tire uniformity machine, so that rotation of the limited-range pivoting arm will position the grindstone adjacent the tire. Rotation of the pivotal arm, however, may not aim the grindstone directly at the center of the tire. That is, the center line and the contact point of the grindstone travel in an arc in an attempt to tangentially contact the tire. Skilled artisans will appreciate that the pivotable movement of the pivoting arm is limited to keeping the grinding stones aligned and tangent with the varying radiuses of both the tire and the grinding stones.

To better position the grindstone to remove material from the tire, known grinders pivotably support the grindstone relative to the pivoting arm. As such, the position of the grindstone can be pivoted to account for the indirect aim of the pivoting arm. To provide such pivotal movement, known grinders incorporate a series of linkages. Due to machining tolerances, each link is a potential source of error. When multiple links are used, such errors are compounded making it more significant in terms of accurately positioning the grindstone to remove material from the tire. Moreover, these linkages are susceptible to breakage resulting in machine downtime. Yet another drawback of the limited-range pivoting arm is that the end that holds the grindstones has a restricted range of motion. As a result, whenever a grindstone needs to be serviced or replaced, a technician must position themselves within the machine's frame. This makes servicing the machine time consuming and difficult, which may lead to an improper installation of the grindstone.

As discussed above, the pivoting arm supporting single or dual grindstones can be a source of inaccuracy in positioning the grindstone or grindstones relative to the tire. Moreover, pivotably supporting the grindstone relative to the pivoting arm so that the grindstone or grindstones can be pivoted to account for rotation of the pivoting arm introduces additional inaccuracies. Another inaccuracy may result from a lift assembly used to vertically position the entire grinding assembly. The weight and overall size of the grinding assembly makes it difficult to vertically and laterally position. As a result, it is difficult to consistently maintain a position of the grinding assembly. It is also difficult to service the grindstones carried by the limited-range pivoting arm. As such, there is a need for a grinding assembly which is more easily supported and amenable to precise positioning and servicing, wherein the vertical and lateral positioning of the grinding assembly can be easily maintained. There is also a need to provide an adapter for the machine which allows for calibrated positioning of the grindstones and the measuring laser. And there is a further need to allow for level adjustment of the grindstones to be in a parallel plane with the tire in the event of any misalignment of the grindstone housing and/or the pivoting arm.

SUMMARY OF THE INVENTION

In light of the foregoing it is a first aspect of the present invention to provide a counterbalanced tire profile generating machine.

Another aspect of the present invention is to provide a tire grinding machine, comprising a frame having a plurality of vertically extending posts, a chuck assembly associated with the frame, the chuck assembly adapted to receive, and rotate a tire, a grinding assembly associated with the frame, the grinding assembly movable with respect to the frame and having at least one grinding element adapted to contact and remove material from the tire when rotated by the chuck assembly, and a counterbalance assembly having a cable with one end connected to a counterbalance weight and an opposite end connected to the grinding assembly.

Yet another aspect of the present invention is to provide a tire grinding machine, comprising a frame having a plurality of vertically extending posts, a chuck assembly associated with the frame, the chuck assembly adapted to receive, and rotate a tire, a grinding assembly associated with the frame, the grinding assembly movable with respect to the frame and having at least one grinding element adapted to contact and remove material from the tire when rotated by the chuck assembly, a block assembly interposed between the frame and the grinding assembly, the block assembly allowing pivotable movement of the grinding assembly with respect to the frame in a first condition and maintaining a fixed position of the grinding assembly with respect to the frame in a second condition.

Still another aspect of the present invention is to provide a calibration adapter used with a tire grinding machine, comprising a frame having a plurality of vertically extending posts, a chuck assembly associated with the frame, the chuck assembly adapted to receive and rotate a tire, a grinding assembly associated with the frame, the grinding assembly movable with respect to the frame and having at least one grinding element adapted to contact and remove material from the tire when rotated by the chuck assembly, and an adapter receivable in the chuck assembly, the adapter having a known position with respect to the chuck assembly so as to allow positional adjustment of the at least one grinding element to the known position for use as a reference point when removing material from the tire.

Yet another aspect of the present invention is to provide a level adjuster used with a tire grinding machine, comprising a frame having a plurality of vertically extending posts, a chuck assembly associated with the frame, the chuck assembly adapted to receive and rotate a tire, a grinding assembly associated with the frame, the grinding assembly movable with respect to the frame and having at least one grinding element adapted to contact and remove material from the tire when rotated by the chuck assembly, and a level adjuster coupled to the grinding assembly, the level adjuster selectively loosened and tightened to position the at least one grinding element in a level plane which is substantially parallel to a rotational plane of the tire received in the chucking assembly.

BRIEF DESCRIPTION OF THE DRAWINGS

These and other features and advantages of the present invention will become better understood with regard to the following description, appended claims, and accompanying drawings wherein:

BEST MODE FOR CARRYING OUT THE INVENTION

Figure 1:
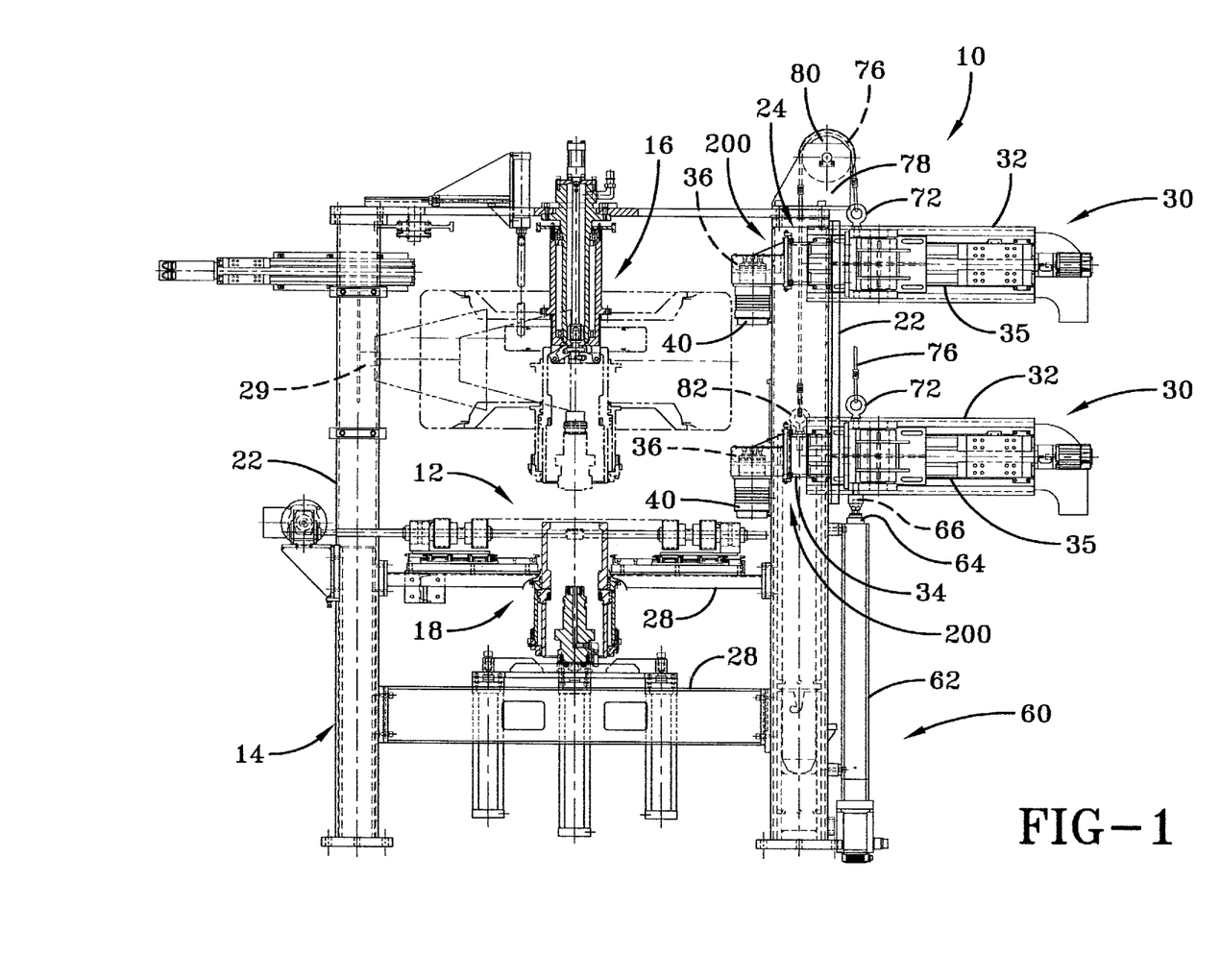
FIG. 1 is a front elevational view of a tire grinding machine with a counterbalance assembly according to the concepts of the present invention.
Figure 2:
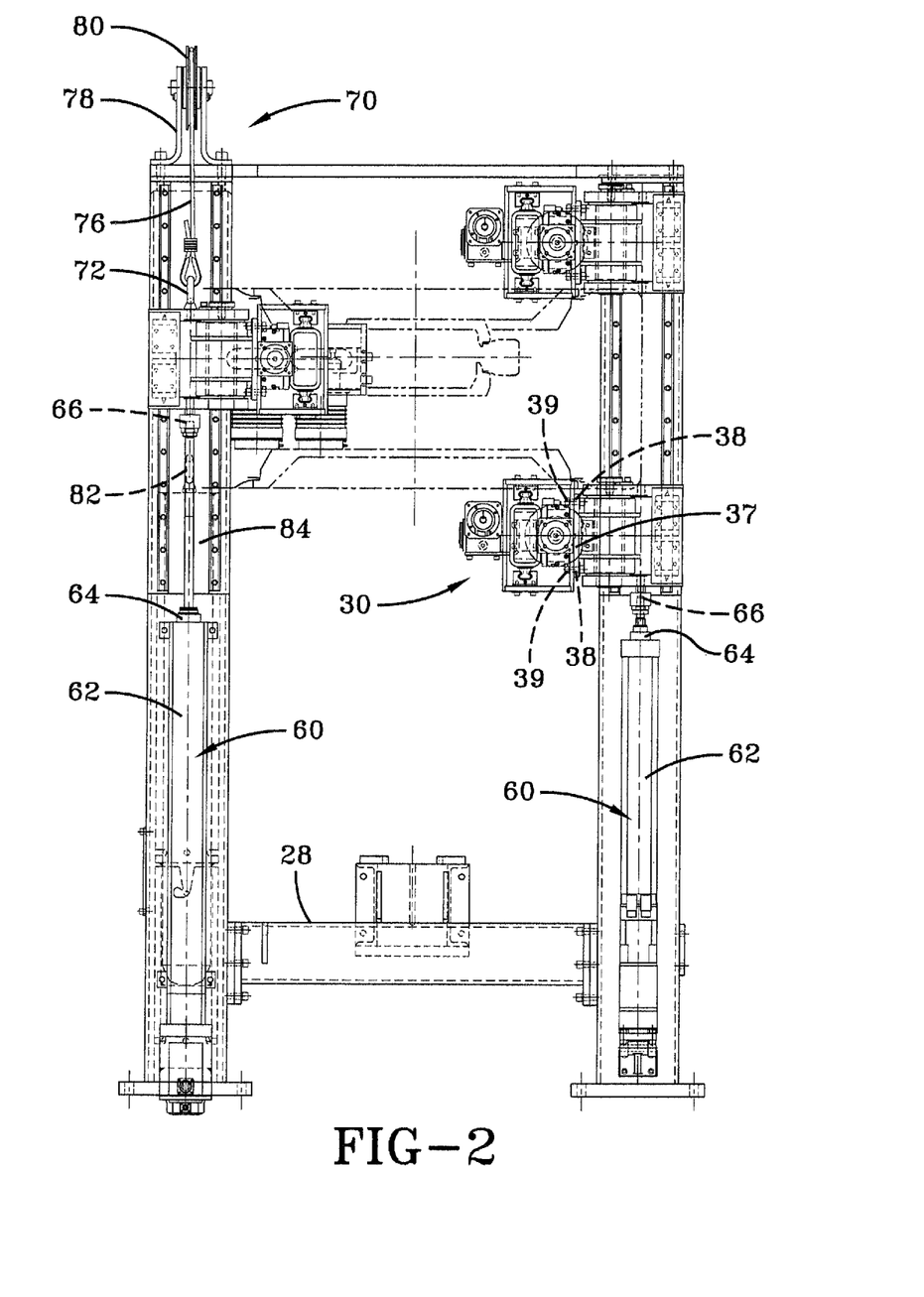
FIG. 2 is a side elevational view of the tire grinding machine with a counterbalance assembly according to the concepts of the present invention.
Figure 3:
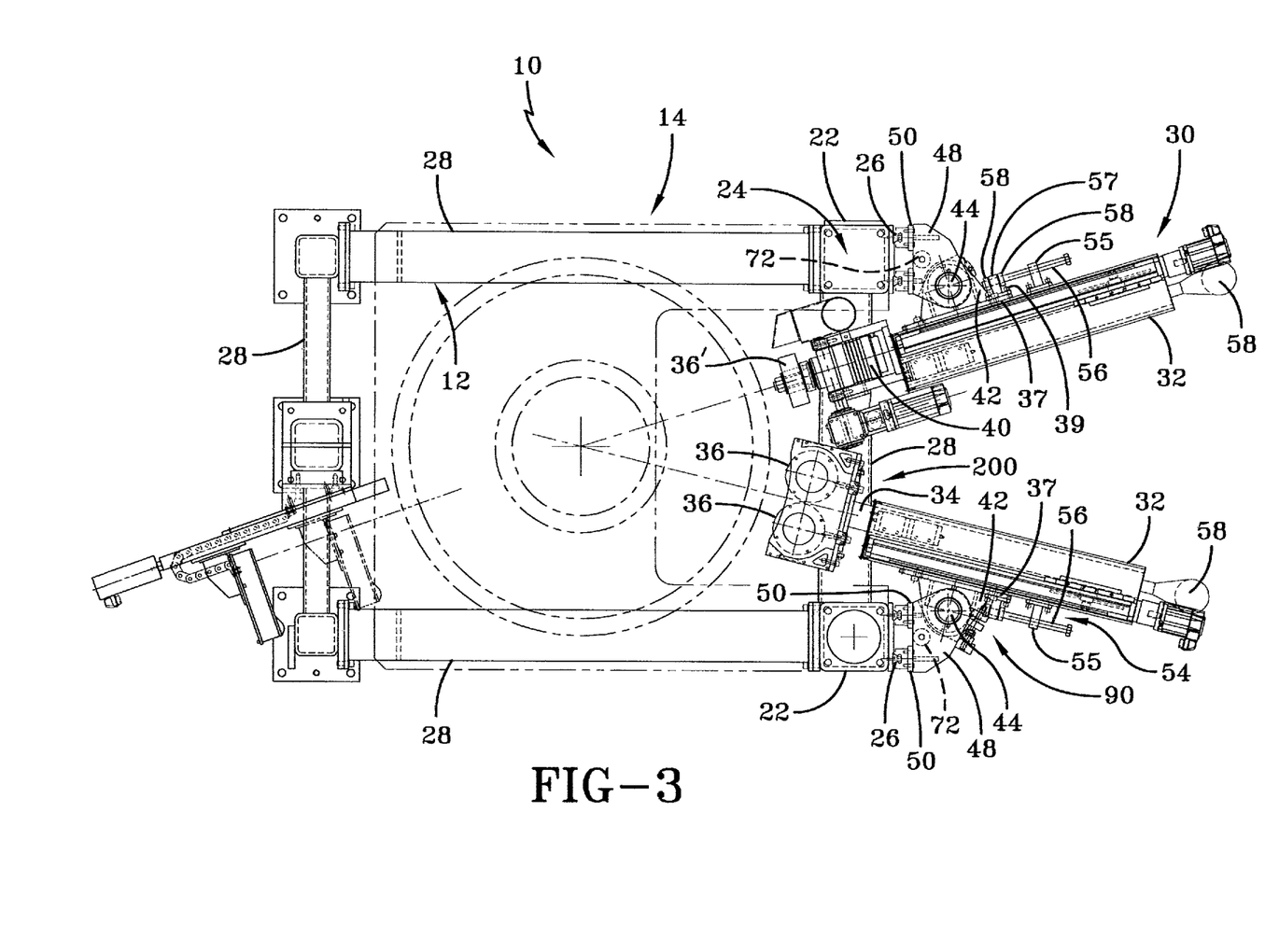
FIG. 3 is a top view of the tire grinding machine with a counterbalance assembly according to the concepts of the present invention.

A tire grinding machine according to the present invention is generally referred to by the numeral 10 and shown in the accompanying FIGS. 1-3. The machine 10 generally receives a tire transferred by a conveyor 12 which may be motorized. The machine 10 includes a frame 14 which supports a chuck assembly comprising an upper chuck assembly 16 opposite a lower chuck assembly 18. The assemblies 16 and 18 capture a tire delivered by the conveyor 12, inflate the tire, and then rotate the tire for the purpose of grinding the tire tread so as to remove excess material as determined by a testing process or other requirement.

The frame 14 includes a plurality of vertical posts 22 which may be of a square construction. Other post shapes may be employed. Selected posts 22 may provide an internal post opening 24 which may extend the entire length of the post. At least one of the posts 22 may include post tracks 26 which extend lengthwise along a selected side of the post. The posts 22 may be interconnected by crossbeams 28 so as to provide rigidity to the frame 14 and also to provide for structural support for the chuck assemblies and any other component associated with the grinding machine. A laser 29 may be carried by the posts 22 or cross beams 28 for the purpose of measuring a tire profile as the tire rotates. The laser 29 is sensitive enough to detect precise radial measurements of the tire. These measurements may then be used to control the grinding machine to precisely modify the tire to meet desired operational requirements.

At least one grinding assembly 30 may be associated with the machine 10 and in the embodiment shown, two grinding assemblies are provided. As will become apparent as the detailed description proceeds, and as best seen in FIG. 2, the grinding assembly 30 is vertically movable with respect to the frame 14 so as to allow for positioning of the grinding assembly with respect to a tire received between the chuck assemblies 16 and 18. The grinding assembly includes a housing 32 which maintains an extension arm 34 which is horizontally movable into and out of the housing 32. Each extension arm includes at least one grinding element 36, although the elements may be provided in pairs as shown. Skilled artisans will also appreciate that the elements may be referred to as at least one grindstone 36, or a flash grinder 36', sometimes called a buffing wheel, and may be positioned at the end of an extension arm as shown in FIG. 3. The flash grinder 36' may be employed to remove extraneous flash on a sidewall of a tire as deemed appropriate. Horizontal movement of the extension arm 34 may include a precision ball screw 35 substantially maintained within the housing which moves the grinding element 36 in a linear horizontal direction radially into and out of contact with the tire so as to remove excess material as determined by a controller (not shown). This horizontal movement may also control the depth and rate at which material is removed. Each grinding element 36 is rotated by a motor 40. Operation of the grinding elements are generally discussed in U.S. Pat. No. 7,381,114, which is incorporated in its entirety herein by reference.

Figure 5:
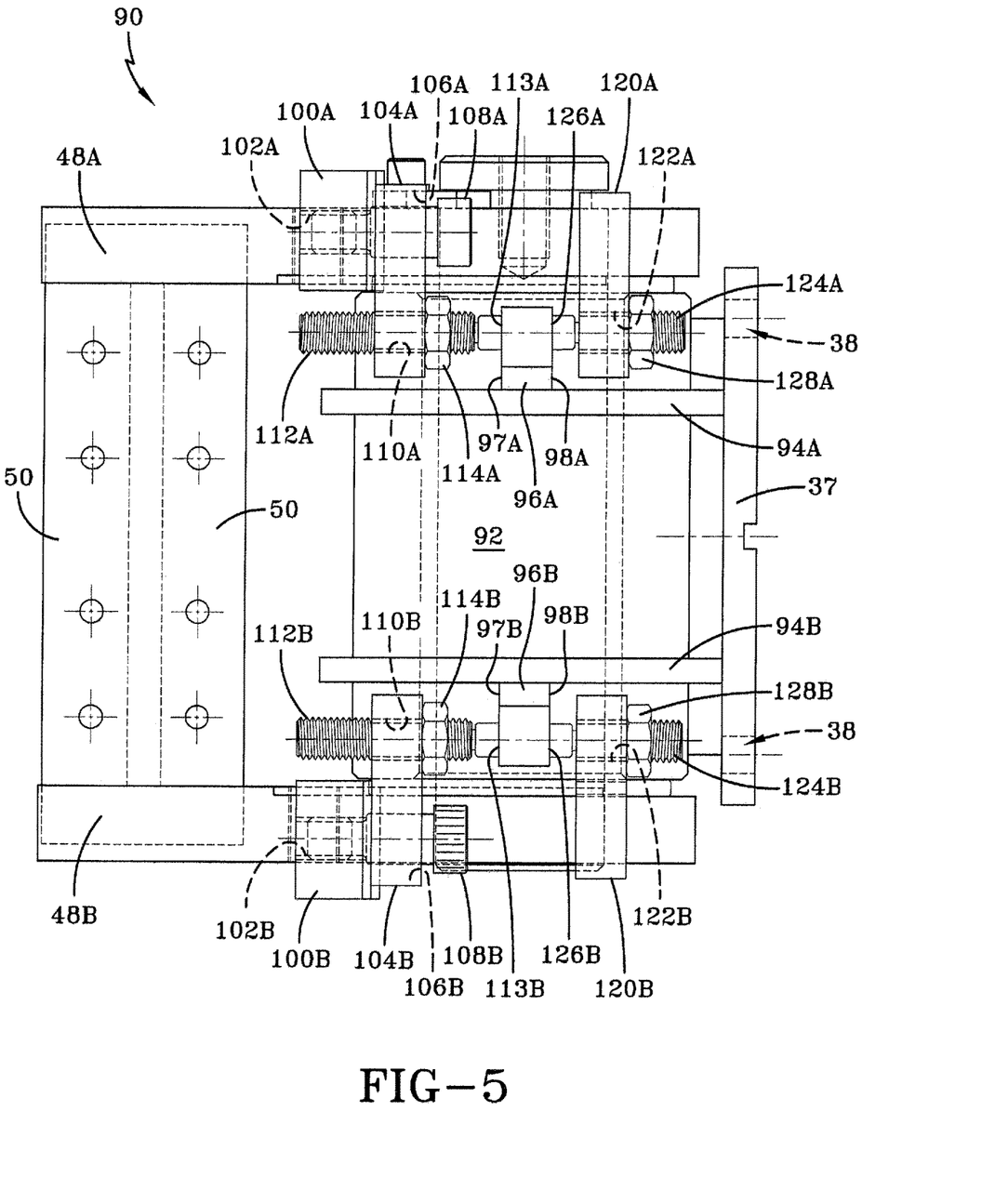
FIG. 5 is a front elevational view of the block assembly for the tire grinding machine according to the concepts of the present invention.

Positioned adjacent a side of the housing 32, and best seen in FIGS. 3 and 5, is a housing adjustment plate 37 which may have a pair of substantially parallel, lengthwise slots 38 extending therethrough. An adjustment bolt 39 may extend through each slot and into the housing 32. The bolts 39 may be loosened from the adjustment plate 37 so as to allow the housing 32 to be slidably and coarsely positioned with respect to the expected tire diameter to be received in the machine in a manner that will be described. Integrally attached to the adjustment plate 37 is a housing bracket 42 which supports a hinge pin 44 that is received and rotatably supported by post brackets 48A and 48B, wherein components associated with an upper post bracket 48A include an A suffix and components associated with a lower post bracket 48B include a B suffix. The pin 44 may be associated with bushings and/or bearings so as to allow pivotable movement of the housing 32 with respect to the adjustment plate 37 and housing bracket 42 and other components associated with the post bracket 48. Each post bracket 48 may include a pair of post rails 50 which are slidably received and movable on the post tracks 26 carried by the post 22. The hinge pin 44 allows for pivotable horizontal movement of the grinding assembly 30 with respect to the vertical post 22 to which it is coupled. Skilled artisans will appreciate that the post rails 50 allow for slidable vertical movement of the grinding assembly with respect to the post 22 in view of their slidable engagement with the post tracks 26. An exhaust system 52 may extend from an end of the housing 32 opposite the grinding elements 36 so as to collect and distribute material ground from the tire away from the grinding machine.

In some embodiments, as seen in FIG. 3, a stop bolt assembly 54 may be mounted on the housing 32 and associated with the housing adjustment plate 37 for the purpose of allowing fine position adjustments of the housing with respect to the frame. Extending laterally from the housing 32 is a bolt carrier 55, wherein the bolt carrier has internal threads that receive a threaded stop bolt 56 which may be employed to prevent unwanted lateral or pivotal movement of the grinding assembly with respect to the vertical post. A plate tab 57 extends from the adjustment plate 37 and has internal threads that allow for receipt of the stop bolt 56. Positioned on the stop bolt and on either side of the plate tab 57 are a pair of positioning nuts 58. In the positioning of the housing 32 with respect to the tire to be received in the uniformity machine, the stop bolt 56 which is part of the associated stop bolt assembly 54, may be rotated to position the housing 32 within and with respect to the frame 14. In other words, the housing may be laterally positioned into a desired radial position with respect to the tire expected to be received in the tire uniformity machine. Loosening of the positioning nuts 58 allow for the stop bolt to be rotated, thus moving the bolt carrier 55 and the housing. When a desired position is obtained, the positioning nuts 58 may be used to tighten the bolt to the plate tab 57. And then the adjustment bolts 39 may be tightened so as to secure the housing adjustment plate 37 to the housing 32. The sequence of the tightening of the bolts and nuts may be switched depending on the desired positional adjustment.

Referring now to FIGS. 1-3, it can be seen that the grinding assembly and in particular the housing 32 may be coupled to a housing lift assembly designated generally by the numeral 60. The housing lift assembly 60 may include a lift housing 62 which is supported by the floor which also supports the frame of the tire grinding machine. The lift housing 62 may include a precision ball screw 64 which moves in an up and down direction and which is substantially vertically aligned with an adjacent vertical post 22. At an end of the precision ball screw 64 is a coupling end 66 which is connected to an underside of the post bracket 48 which is hingedly coupled to the housing 32. Skilled artisans will appreciate that a controller (not shown) controls actuation of the precision ball screw 64 so as to vertically position the housing and the grinding assembly in relation to the tire captured between the upper and lower chuck assemblies 16 and 18. Skilled artisans will also appreciate that other types of mechanisms which provide precise movement in 0.001" increments or less may be used in place of the precision ball screw devices described above. The housing lift assembly may also be used to move the grinding elements in a desired direction so as to remove selected portions of the tire tread or tire sidewall and/or flash material as needed.

A counterbalance assembly is designated generally by the numeral 70 and is associated with or coupled to the grinding assembly 30 and in particular to the structural features associated with the post bracket 48 and the housing 32. In particular, the assembly 70 may include a bracket eyelet 72 which may extend from the post bracket 48 or other portion of the housing 32 as deemed appropriate. Extending from the eyelet 72 is a cable 76 which is secured to the bracket eyelet at one end.

A pulley bracket 78, which may be part of the assembly 70, may be mounted, in one embodiment, to a top end of the vertical post 22, and wherein a pulley 80 is rotatably maintained within the pulley bracket 78. The pulley receives the cable 76 and an opposite end of the cable is connected to a weight eyelet 82. Secured to the weight eyelet 82 is a counterweight 84 which is slidably received within the internal post opening 24 of the vertical post 22. The counterweight 84 weighs approximately the same amount as the grinding assembly 30 and its associated components. As such, skilled artisans will appreciate that the counterweight reduces the amount of lifting power required by the lift assembly 60 which in turn enables fine vertical movement of the grinding assembly as needed.

Figure 4:
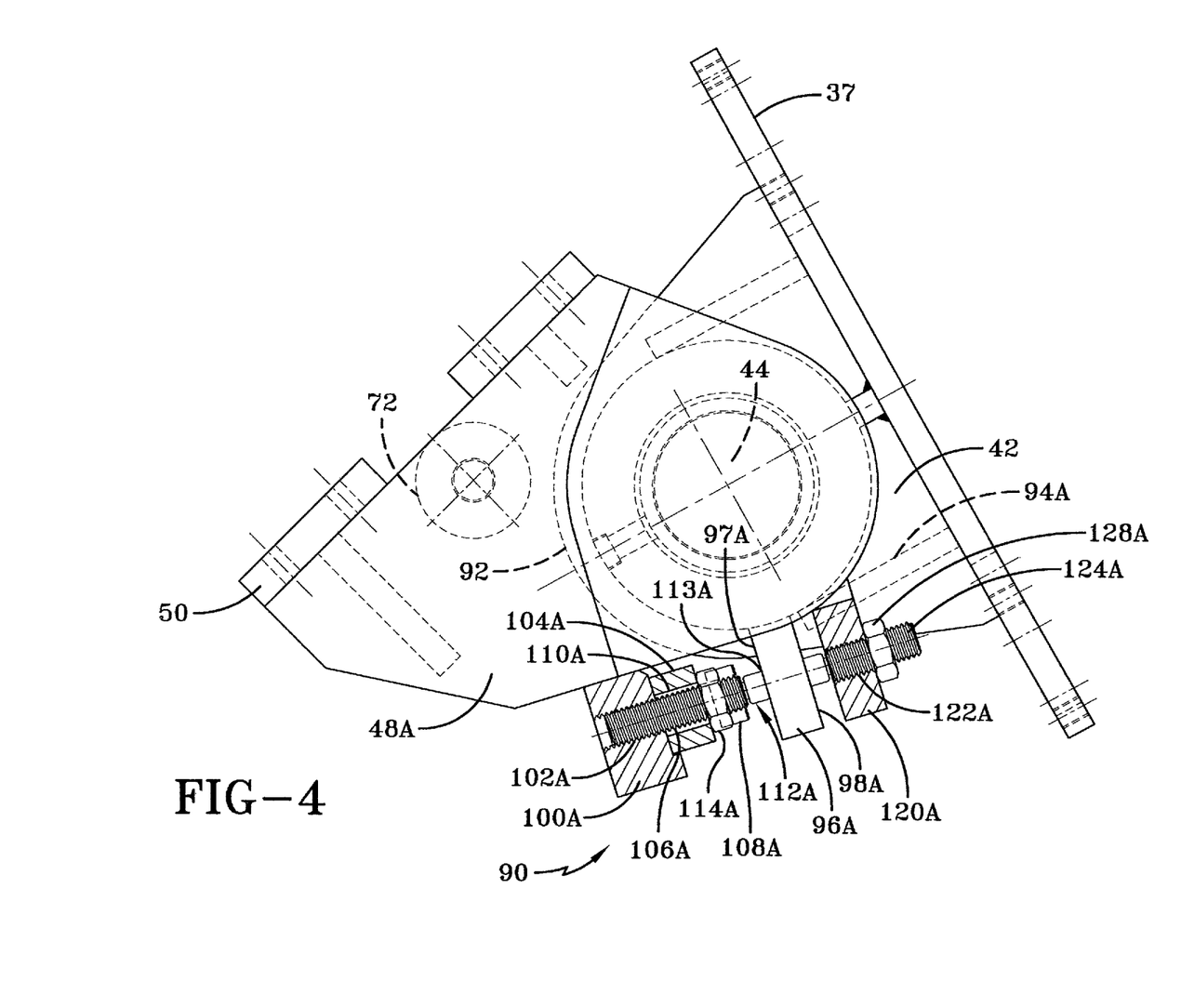
FIG. 4 is a top view of a block assembly for the tire grinding machine with a counterbalance assembly according to the concepts of the present invention.

Referring now to FIGS. 3-5, it can be seen that a block assembly is designated generally by the numeral 90. As will become apparent as the description proceeds, the block assembly secures the angular position of the housing with respect to the frame, but also allows for the housing 32 and the associated grinding elements to be pivoted away from the internal area of the machine 10 in the boundary defined by the vertical posts 22. This pivoting allows for a technician to easily access the grinding elements and associated motor 40 so that servicing may be performed safely on those components without having to do so from within the internal area of the uniformity machine. This provides for consistency in replacing the component parts and ensures proper operation of the motor 40 and the grinding elements 36. In any event, the block assembly 90 includes a pin collar 92, which is pivotable on the hinge pin 44 by virtue of bushings and/or bearings associated therewith. Secured and/or welded to the housing adjustment plate 37 are opposed collar brackets 94A and 94B. The pin collar 92 is connected to and between the collar brackets 94A and 94B. As such, the housing 32 is pivotable with respect to the pin 44 through the integral connection of the adjustment plate 37, the collar brackets 94, and the pin collar to one another. Skilled artisans will appreciate that there may be a pair of collar brackets 94 wherein one is provided at an upper edge (94A) of the pin collar 92 and the other is provided at a lower edge (94B) of the pin collar. As noted previously, the upper components associated with the upper collar bracket 94 utilize a capital letter A suffix while the lower collar bracket 94 and components associated therewith utilize a capital letter B suffix.

A collar tab 96A may extend radially from an upper edge of the pin collar 92 and a corresponding collar tab 96B likewise may extend from a lower edge of the pin collar 92 at the same angular orientation as the collar tab 96A. Each collar tab 96 provides for a piston side 97 on one side and a limit side 98 on an opposite side.

As best seen in FIG. 3, the post bracket 48 extends from the corresponding vertical post 22. Indeed, a pair of post brackets 48A and 48B extend from the corresponding vertical post so as to support the selected components of the pin 44 and the other components of the block assembly as will be described.

Each post bracket 48 provides for a bracket block 100 which extends radially therefrom and provides for a block hole 102 extending therethrough. Pivotably coupled to each bracket block 100 is a carrier block 104 which provides for a block hole 106 that extends therethrough and which is aligned with the block hole 102. A block screw 108 extends through the block holes 102 and 106. When the block screw 108 is tightened, the carrier block 104 is maintained in a fixed position. However, when the block screw 108 is loosened, the carrier block 104 may be pivoted or swiveled in a desired direction as will be described.

Each carrier block 104 also provides for a position hole 110 extending therethrough, which is at the end of the carrier block opposite the block hole 102. Received within the position hole 110 is a position set screw 112 which extends therethrough. Skilled artisans will appreciate that the position hole 110 may be internally threaded and that the position set screw 112 may be externally threaded so as to allow for positional adjustment of the set screw 112 within the carrier block 104. The set screw 112 may also provide for a flat surface 113 which may contact the position side 97 of the corresponding collar tab 96. A holding nut 114 may be received on the position set screw 112 and is utilized to hold the set screw in a desired position within the position hole 110.

A limit block 120 may extend radially from the corresponding upper and lower post brackets 48. Each limit block 120 has a block hole 122 extending therethrough, wherein the block hole 122 is internally threaded. Each hole 122 receives a block set screw 124 which is externally threaded to allow for positional adjustment of the set screw 124 in the hole 122. Each set screw 124 provides for a flat surface 126 which may contact the collar tab 96 and, in particular, the limit side 98. A holding nut 128 may be provided on the set screw 124 so as to lock the set screw's position in place with respect to the limit block 120. Although a pair of post brackets 48A and 48B are shown and described in this embodiment, it will be appreciated that in some embodiments a single bracket block, carrier block, position set screw, collar tab, and limit block may be used to allow adjustment and fixing of the housing's angular position with respect to the associated vertical post.

An angular position of the housing 32 with respect to an associated post 22 may be changed or adjusted by use of the block assembly 90. This is done by first loosening and retracting the position set screws 112 and 124 so that they do not impede movement of the collar tabs 96 during pivotable movement of the housing. To further ensure that the pivotable movement is not impeded, the block screws 108 are loosened so that the carrier blocks 104 may be pivoted out of the path of the collar tabs 96. In the instance of the carrier block 104A, the carrier block is pivoted upwardly, and in the instance of the carrier block 104B, it is pivoted downwardly. It will be appreciated in these positions that the housing may be pivoted outwardly, or away from the machine frame, so as to allow for servicing of the grinding elements and the associated motor and any other components within the housing. It will further be appreciated that pivotable movement is limited when the collar tab 96 comes in contact with the limit block 120. As a result, the housing can only be pivoted to within the frame a predetermined amount, but can be rotated outside the confines or boundary of the frame defined by the posts.

Once the servicing is complete, the housing is rotated back into a general position within the machine. Once all calibration is completed, as will be described in further detail below, the block assembly is employed to secure the housing in place to ensure its position and provide for repeatable grinding operations. In any event, once an angular position of the housing is set, the carrier blocks 104 are rotated back into place so that their respective position set screws 112 are aligned to engage with the collar tabs 96. At this time, the set screws are rotated inwardly so that the respective flat surface 113 contact the position side 97 of the collar tabs. In a similar manner and at about the same time, the block set screws 124 may be rotated inwardly so that their respective flat surfaces 126 contact the limit side 98 of the collar tabs 96. The holding nuts 128 and 114 may then be tightened so that the pivotable position of the pin collar 92 with respect to the hinge pin 44 is secured in place.

Figure 6:
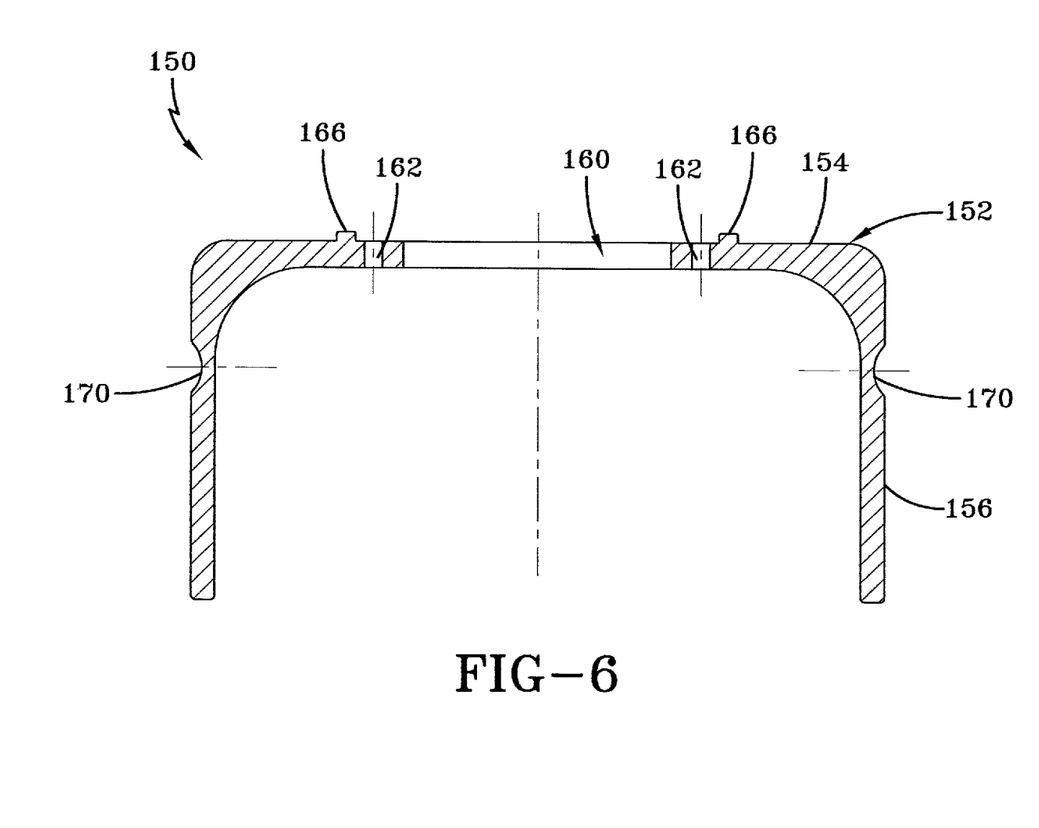
FIG. 6 is a cross-sectional view of a grinder and laser calibration adapter for use with the tire grinding machine according to the concepts of the present invention.
Figure 7:
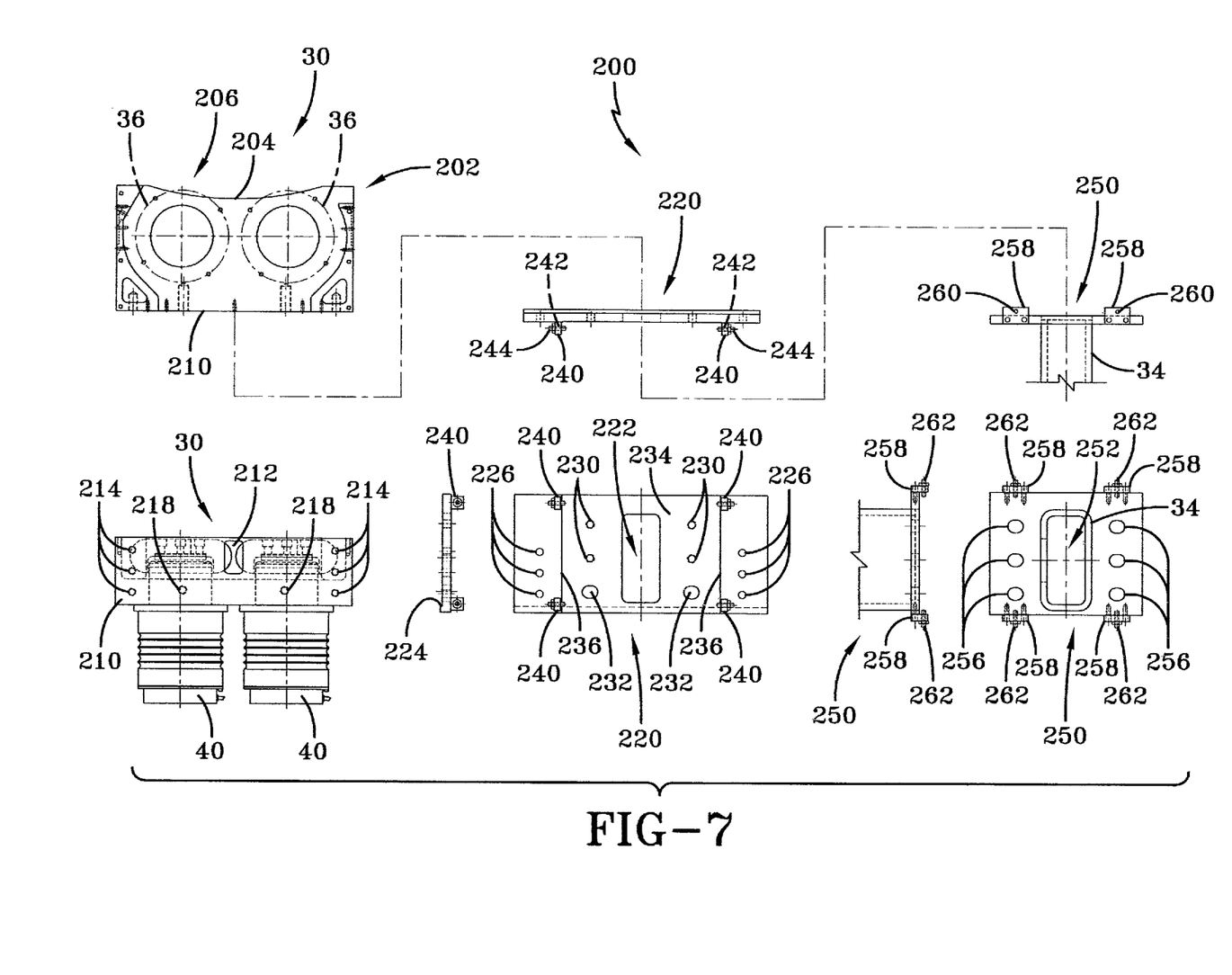
FIG. 7 is an exploded assembly view of a level adjuster for the tire grinding machine with a counterbalance assembly according to the concepts of the present invention.

Referring now to FIG. 6, if can be seen that a grinder and laser calibration adapter is designated generally by the numeral 150. The adapter 150 may be mounted to the grinding machine 10 and in particular to the upper chuck assembly 16. The adapter 150 includes an adapter body 152 which provides for a mounting base 154 that is secured to the upper chuck assembly 16. An annular sidewall 156 extends downwardly from the base 154. The mounting base 154 provides a mounting hole 160 that may be received within a corresponding component of the upper chuck assembly. An attachment ring 166 annularly extends around the mounting hole and is received within the chuck assembly so as to provide a known position of the adapter 150 within the chuck assembly. A number of attachment holes 162 are provided through the mounting base 152 radially about the outer periphery of the mounting hole 160 such that fasteners may be positioned therethrough to allow for secure attachment of the adapter 150 to the chuck assembly.

Extending around the sidewall 156 and radially inward a predetermined amount is a calibration groove 170. Skilled artisans will appreciate that the sidewall 156 provides for a precise known dimension which is provided so as to calibrate the laser 29 or lasers which may be mounted to the frame 14 so as to ensure their accurate positioning and measurement of any tire that is received within the chucking assemblies. Likewise, the calibration groove 170 is employed to allow for precise vertical and radial positioning of the grindstones that are carried by the housing 32 in their respective positions. Once the grindstones are calibrated with a known position provided by the precision ball screws 35 and 64, the housing is secured into position by virtue of use of the block assembly 90 and also the stop assembly 54. In some embodiments, the grooves 170 may be replaced with a contour or shape to accommodate the flash grinder or buffing wheel.

Referring now to FIGS. 1 and 3, and also to FIGS. 7-10, it can be seen that a grinding element level adjuster, which is designated by the number 200, is coupled between the extension arm 34 a grinding element housing 202. Generally, the purpose of the level adjuster is to ensure that the grinding elements are in a level plane which is substantially parallel to the rotational plane of the tire received in the grinding machine. Moreover, the adjuster 200 is initially loosened to allow for positional adjustment of the grinding elements 36 so that they may be properly seated in the calibration groove 170. Once the grinding elements are properly seated, the adjuster 200 is secured in place to maintain the grinding elements in the desired level plane position. As used in the following discussion, the terms "vertical" and "horizontal" are used in reference to the plane in which the grinding element is oriented. As such, the term horizontal, or variations thereof, is substantially parallel with the element's plane of rotation and the term vertical, or variations thereof, is substantially orthogonal with the element's plane of rotation. It will be appreciated that these terms are for reference when considering the associated drawings and should not be construed as limiting.

As best seen in FIGS. 7-10, the level adjuster 200 includes a grinding element housing 202 which carries the motors 40 and their associated grinding elements 36. The housing comprises a top, bottom, rear, and opposed sides which surround the elements and a housing face 204 which comprises the front side of the housing 202. The housing face 204 provides for a housing opening 206 from which the elements partially extend so as to enable their contact with the tire mounted in the grinding machine. The rear of the housing 202 may provide a housing backplate 210 which is opposite the housing face 204. Extending through the backplate 210 may be a debris opening 212. The housing backplate 210 provides for a plurality of outer backplate holes 214 which may be internally threaded. As shown in the drawings, there are three outer backplate holes 214 substantially vertically aligned with one another on each side of the housing backplate 210. It will further be appreciated that each of the three vertically aligned outer backplate holes 214 are horizontally aligned with a corresponding backplate hole on the other side of the housing backplate. The backplate 210 may also provide for two inner backplate holes 218 which may be internally threaded and which are horizontally aligned with one another and which may be somewhat horizontally aligned with the two lowermost outer backplate holes 214. In some embodiments, inserts 219 may be provided that are carried by the backplate 210 and in which the holes 214 and 218 are formed. These inserts 219 are utilized so as to provide a harder material than may be normally used with the housing 202. The housing 202 may be constructed of aluminum or like material so as to reduce the weight of the overall assembly.

A mounting plate 220 may be detachably securable to the housing backplate 210 and as will be discussed is configured to be slightly adjustable with respect thereto for the purpose of leveling the grinding elements. In any event, the mounting plate 220 provides for a vacuum opening 222 which is contiguous with the internal area of the housing 202 through the debris opening 212. As will be appreciated by those skilled in the art, any debris generated by the rotation of the grinding elements may be extracted through opening 212 and the vacuum opening 222 by a vacuum system maintained within the extension arm 34. The mounting plate 220 may be provided with a horizontal backside step 224 which fits or nests on a lower bottom edge of the housing 202. Extending through the mounting plate 220 are a plurality of outer mounting plate holes 226 which may be threaded. Each of the outer mounting plate holes 226 is positionally aligned with a corresponding outer backplate hole 214. As such, there are three substantially vertically aligned outer mounting plate holes 226 which are also aligned with the vertically aligned outer backplate holes 214. Also extending through the mounting plate 220 is a pair of inner mounting plate holes 230 on each side of the vacuum opening 222. There are two holes 230 on each side of the mounting plate 220 positioned between an edge of the vacuum opening 222 and the outer mounting plate holes 226. Also extending through the mounting plate 220 are a pair of mounting plate adjustment slots 232. These slots are not threaded and their center positions are vertically aligned with the inner mounting plate holes 230 on each respective side. Each adjustment slot 232 may be horizontally aligned with the other. The mounting plate 220 also provides for an arm plate pocket 234 which provides a recessed surface with respect to the mounting plate wherein the pocket is formed by pocket steps 236 that are vertically oriented with respect to one another and which are each respectively positioned between the vertically aligned outer mounting plate holes 226 and the vertically aligned inner mounting plate holes 230, and the mounting plate adjustment slots 232. A plurality of adjustment tabs 240 extend from a surface of the mounting plate wherein the tabs each have a threaded tab hole 242 extending therethrough so as to receive a set screw 244. The set screws 244 are configured to be horizontally oriented. Moreover, an edge of the tabs 240 is aligned with the pocket steps 236 and is positioned near the upper and lower vertical edges of the mounting plate.

An extension arm plate 250, which may be detachably secured to the mounting plate 220 and the housing backplate 210, may be welded or otherwise secured to an end of the extension arm 34. The extension arm plate 250 provides for a plate hole 252 extending therethrough which is aligned with the debris opening 212 and the vacuum opening 222 of the mounting plate 220 to permit debris removal. The extension arm plate provides for extension arm plate adjustment slots 256 in a 2×3 array. In other words, there are three vertically aligned slots 256 on both side edges of the plate and positioned between a vertical edge of the plate and the adjacent edge of the plate hole 252. Moreover, the respective slots 256 are aligned with the inner mounting plate holes 230 and the adjustment slots 232 of the mounting plate 220, and also the inner backplate holes 218 of the housing backplate 210. Mounted on each vertical edge of the plate 230 are a pair of adjustment tabs 258 which extend from a top and bottom horizontal edge of the extension arm plate 250. Each tab 258 provides for a threaded tab hole 260 which receives a corresponding set screw 262 wherein the set screws are vertically oriented.

Figure 8:
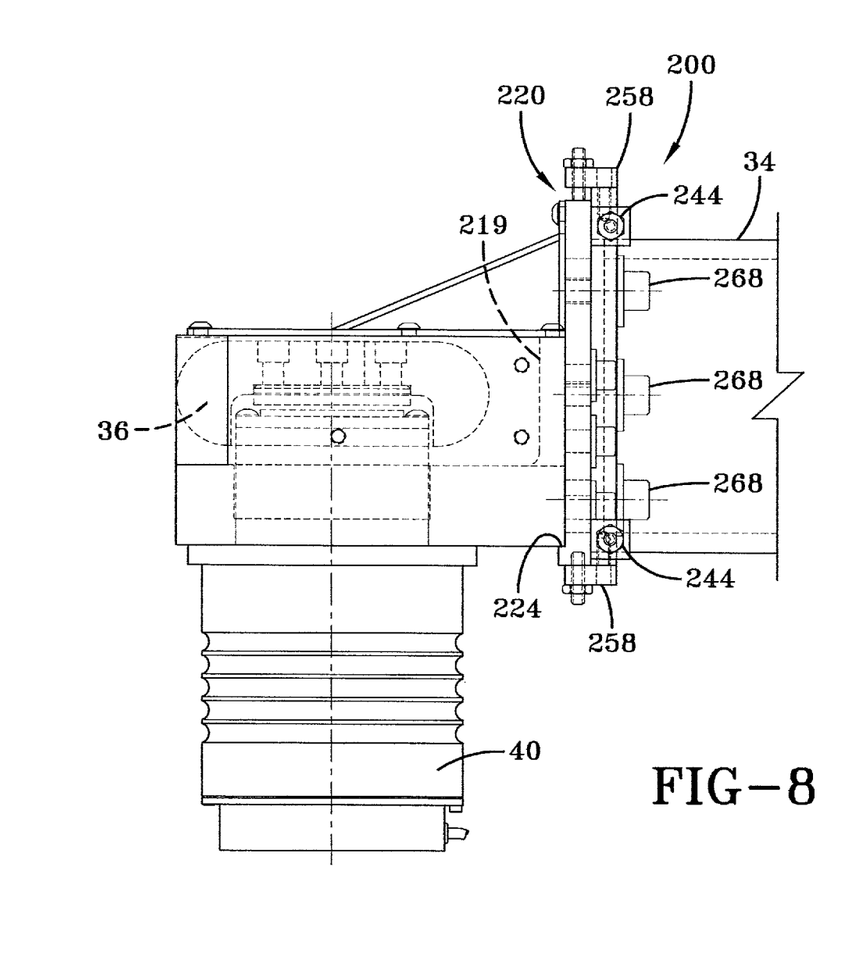
FIG. 8 is a side elevational view of the level adjuster according to the concepts of the present invention.
Figure 9:
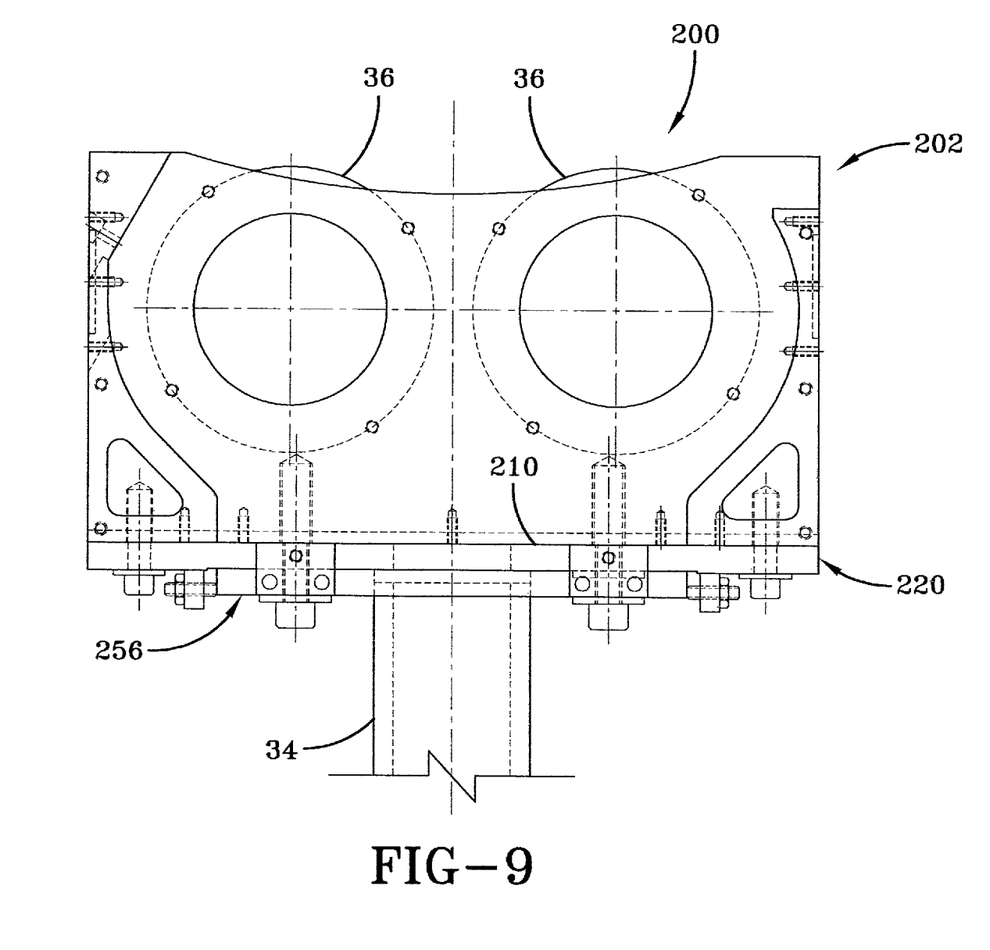
FIG. 9 is a top view of the level adjuster according to the concepts of the present invention.
Figure 10:
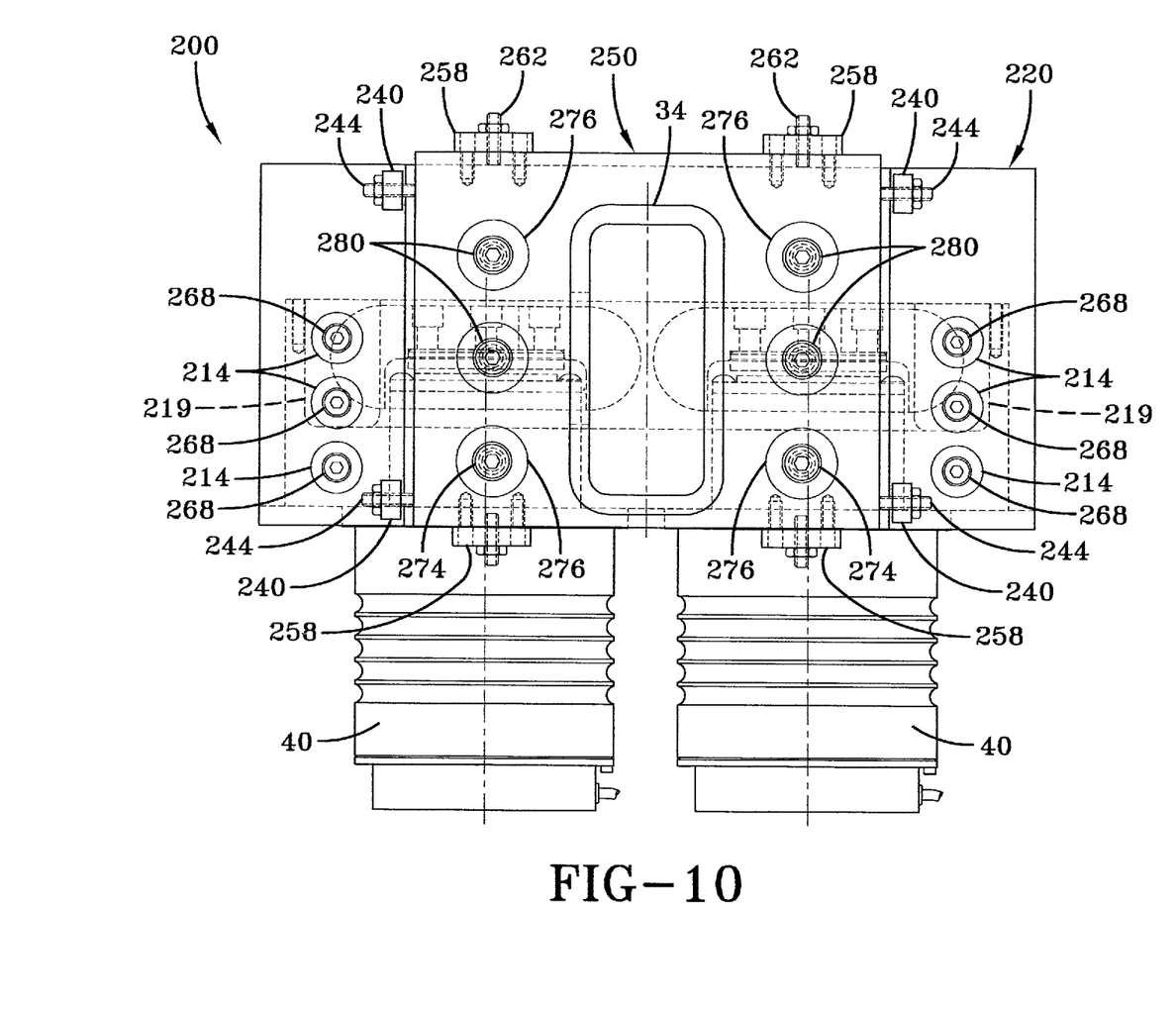
FIG. 10 is a rear elevational view of the level adjuster according to the concepts of the present invention.

As best seen in FIGS. 8-10, the extension arm plate 250 may be detachably coupled to the mounting plate 220 which, in turn, may be detachably coupled to the housing backplate 210. A plurality of outer fasteners 268 are employed to extend through the mounting plate holes 226 of the mounting plate 220 and into the outer backplate holes 214 for securement to the backplate 210. Washers 270 may be employed with the outer fasteners to facilitate the attachment of the mounting plate 220 to the housing backplate 210.

A pair of housing plate inner fasteners 274, which may be supported by corresponding washers 276, extend through the lower pair of adjustment slots 256 and the mounting plate adjustment slots 232 and are received in the inner backplate holes 218. As such, the mounting plate 220 may be positionally adjusted with respect to the housing backplate 210 by loosening the housing plate inner fasteners 274 until a desired position is received. In conjunction with this adjustment, a plurality of coarse adjustment fasteners 280 may extend through the extension arm plate adjustment slots 256 for receipt in the inner plate mounting holes 230. When the fasteners 280 are in a loose condition, the extension arm plate 250 may be slidably positioned with respect to the mounting plate 220. Skilled artisans will further appreciate that the set screws 262 carried by the extension arm plate 250 and the set screws 244 carried by the mounting plate 220 may also be used to position the extension arm plate 250 with respect to the mounting plate 220.

In operation, the extension arm and the grinding elements, which are grindstones in this embodiment, are positioned in relation to the calibration adapter 150 as discussed previously. To accomplish this, the mounting plate 220 is first fastened to the housing backplate 210 by use of the outer fasteners 268. Next, the extension plate 250 is mounted to the mounting plate 220 and also the backplate 210 by use of the housing plate inner fasteners 274. This allows for a coarse amount of movement between the mounting plate 220 and the backplate 210. Next, the coarse adjustment fasteners 280 are inserted through the slots 256 and received in the corresponding holes 230. Next, the set screws 244 are tightened so as to make contact with the vertical edges of the extension arm plate 250 and the set screws 262 are adjusted to contact the horizontal edges of the mounting plate 220 as shown in the drawings. Accordingly, when the grindstones are positioned into the groove of the calibration adapter, any positional adjustments of the housing 202 may be made by various loosening and tightening of the fasteners and the adjustment set screws so that a desired position is obtained. Once obtained, the fasteners and the screws may be further tightened to lock the position of the housing with respect to the calibration adapter in place. Such a configuration is advantageous in that proper alignment of the grindstones with respect to the tire received in the grinding machine may be obtained. This parallel and in plane rotational alignment of the grindstones is needed in the event of deformities in the extension arm or the grinding element housing occur during manufacture, or as a result of misalignment problems that develop during continued operation of the machine. A similar calibration may be done for grinding elements which are not grindstones. Skilled artisans will appreciate that the features of the extension arm plate and the mounting plate may be switched in some embodiments.

The advantages of the present invention are readily apparent. Use of the counterbalance assembly 70 applies much less stress on the precision ball screw 64 and allows for finer vertical positional movement of the grinding elements. It also facilitates more accurate placement of the grinding assembly 30 in relation to the tire tread or tire sidewall. Skilled artisans will further appreciate that placement of the bracket eyelet 72 with respect to the counterweight 84 may be employed so as to properly balance the grinding assembly 30 as needed. Moreover, placement of the counterweight within the vertical post, conceals the counterweight so as to prevent interference with its movement. Additionally, concealment of the counterweight provides a safety function by preventing hands or fingers being pinched by the weight during movement. And, in the event of the cable 76 breaking, the weight is contained within the post.

Yet a further advantage of the present invention is the use of the block assembly 90 in conjunction with the stop assembly 54 so as to properly position the angular position of the housing and associated grinding element with the center line of the upper and lower chuck assemblies 16 and 18. Moreover, use of the block assembly allows for the pivotable movement of the housing and the grinding assemblies outside of the frame 14 to permit servicing of the grinding elements and associated components. Use of the block assembly and stop assembly in conjunction with the grinder and laser calibration adapter 150 permits precise alignment of the grinding elements with respect to any tire received between the chuck assemblies. Accordingly, with the linear vertical movement of the housing and the linear lateral adjustment of the grinding element within the housing, precise positioning of the grinding elements may be obtained so as to obtain precise removal of excess material as determined by the measurements obtained by the laser.

Thus, it can be seen that the objects of the invention have been satisfied by the structure and its method for use presented above. While in accordance with the Patent Statutes, only the best mode and preferred embodiment has been presented and described in detail, it is to be understood that the invention is not limited thereto or thereby. Accordingly, for an appreciation of the true scope and breadth of the invention, reference should be made to the following claims.

What is claimed is:

1. A tire grinding machine, comprising:
a frame having a plurality of vertically extending posts;
a chuck assembly associated with said frame, said chuck assembly adapted to receive, and rotate a tire;
a grinding assembly associated with said frame, said grinding assembly movable with respect to said frame and having at least one grinding element adapted to contact and remove material from the tire when rotated by said chuck assembly;
a grinding assembly housing carrying said grinding assembly;
a block assembly interposed between said frame and said grinding assembly, said block assembly allowing pivotable movement of said grinding assembly with respect to said frame in a first condition and maintaining a fixed position of said grinding assembly with respect to said frame in a second condition; and
a housing adjustment plate having substantially parallel, lengthwise slots, respective ones of said slots receiving a respective adjustment bolt extending through said respective one of said slots and into said grinding assembly housing.

2. The tire grinding machine according to claim 1, further comprising:
a counterbalance assembly having a cable with one end connected to a counterbalance weight and an opposite end connected to said grinding assembly.

3. The tire grinding machine according to claim 2, further comprising:
a pulley maintained near a top end of one of said plurality of vertically extending posts which has an internal post opening, wherein said cable is received on said pulley and said counterbalance weight is received in said internal post opening.

4. The tire grinding machine according to claim 3, further comprising:
a housing lift assembly, which is supported by a floor supporting said frame, having a precision ball screw coupled to an underside of said grinding assembly housing to assist with vertical movement of said grinding assembly.

5. The tire grinding machine according to claim 4, wherein said one of said plurality of vertically extending posts comprises at least one post track extending in a vertical direction, and said grinding assembly having at least one post rail slidably coupled to said at least one post track.

6. The tire grinding machine according to claim 5, wherein said precision ball screw moves said grinding assembly along said at least one post track.

7. The tire grinding machine according to claim 5, wherein said grinding assembly comprises:
an extension arm movable into and out of said grinding assembly housing, said extension arm carrying said at least one grinding element.

8. The tire grinding machine according to claim 7, wherein said grinding assembly further comprises:
a housing bracket extending from a side of said grinding assembly housing, said housing bracket being integrally attached to said adjustment plate; and
a post bracket pivotably coupled to said housing bracket by a hinge pin, wherein said at least one post rail extends from said post bracket.

9. The tire grinding machine according to claim 3, further comprising:
a pulley bracket extending from a top edge of said one of said plurality of vertically extending posts, said pulley carried by said pulley bracket so an outer diameter of said pulley is aligned with said internal post opening.

10. The tire grinding machine according to claim 1, further comprising:
said grinding assembly housing having a housing bracket extending therefrom;
a post bracket extending from one of said plurality of vertically extending posts; and
a pin allowing pivotable movement of said housing bracket with respect to said post bracket;
said block assembly comprising:
at least one collar tab extending from said housing bracket;
at least one bracket block extending radially from said post bracket;
a carrier block pivotably movable with respect to said bracket block, said carrier block selectively movable to engage said at least one collar tab in said second condition and allow pivotable movement of said housing bracket in said first condition.

11. The tire grinding machine according to claim 10, further comprising:
a positional set screw carried by said at least one carrier block, said positional set screw contacting said collar tab in said second condition.

12. The tire grinding machine according to claim 10, further comprising:
an adapter receivable in said chuck assembly, said block assembly allowing movement of said grinding assembly to positionally adjust said at least one grinding element to a known position provided by said adapter when in said first condition.

13. The tire grinding machine according to claim 12, further comprising:
a level adjuster interposed between said housing and said grinding assembly, said level adjuster having a mounting plate and an extension arm plate, where both said mounting plate and said extension arm plate are detachably secured to either said housing or said grinding assembly so as to allow positional adjustment of said at least one grinding element with respect to said known position of said adapter.

14. The tire grinding machine according to claim 1, further comprising a calibration adapter comprising:
an adapter receivable in said chuck assembly, said adapter having a known position with respect to said chuck assembly so as to allow positional adjustment of said at least one grinding element to said known position for use as a reference point when removing material from the tire.

15. The tire grinding machine according to claim 14, the calibration adapter further comprising:
at least one laser mounted to said frame, said at least one laser measuring said adapter received in said chuck assembly for calibration of said at least one laser.

16. A grinding element level adjuster used with a tire grinding machine, comprising:

a frame having a plurality of vertically extending posts;
a chuck assembly associated with said frame, said chuck assembly adapted to receive and rotate a tire;
a grinding assembly associated with said frame, said grinding assembly movable with respect to said frame and having at least one grinding element adapted to contact and remove material from the tire when rotated by said chuck assembly; and
a level adjuster coupled to said grinding assembly, said level adjuster selectively loosened and tightened to position said at least one grinding element in a level plane which is substantially parallel to a rotational plane of the tire received in said chucking assembly;
wherein said grinding assembly comprises:
a housing; and
an extension arm movable into and out of said housing, said extension arm carrying a grinding element housing carrying said at least one grinding element;
said level adjuster interposed between said extension arm and said grinding element housing.

17. The grinding element level adjuster according to claim 16, further comprising:
a mounting plate detachably secured to said grinding element housing and adjustable with respect thereto; and
an extension arm plate detachably secured to said mounting plate and secured to said extension arm,
said mounting plate and said extension arm plate selectively movable to allow for positioning of said at least one grinding element to be parallel and in the rotational plane alignment of the tire received in said chuck assembly.

18. A tire grinding machine, comprising:
a frame having a plurality of vertically extending posts;
a chuck assembly associated with said frame, said chuck assembly adapted to receive, and rotate a tire;
a grinding assembly associated with said frame, said grinding assembly movable with respect to said frame and having at least one grinding element adapted to contact and remove material from the tire when rotated by said chuck assembly;
a block assembly interposed between said frame and said grinding assembly, said block assembly allowing pivotable movement of said grinding assembly with respect to said frame in a first condition and maintaining a fixed position of said grinding assembly with respect to said frame in a second condition; said block assembly further comprising:
at least one collar tab extending from said housing bracket;
at least one bracket block extending radially from a post bracket; and
a carrier block pivotably movable with respect to said at least one bracket block, said carrier block selectively movable to engage said at least one collar tab in said second condition and allow pivotable movement of said housing bracket in said first condition; and
a housing carrying said grinding assembly, said housing having a housing bracket extending from said housing.

* * * * *